United States Patent
Bayer et al.

(10) Patent No.: US 10,189,748 B2
(45) Date of Patent: Jan. 29, 2019

(54) HEAT MOLDABLE CERAMIC COMPOSITION

(71) Applicant: Dow Global Technologies LLC, Midland, MI (US)

(72) Inventors: Roland Bayer, Walsrode (DE); Anette Wagner, Walsrode (DE)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 361 days.

(21) Appl. No.: 15/105,836

(22) PCT Filed: Jan. 9, 2015

(86) PCT No.: PCT/US2015/010748
§ 371 (c)(1),
(2) Date: Jun. 17, 2016

(87) PCT Pub. No.: WO2015/108769
PCT Pub. Date: Jul. 23, 2015

(65) Prior Publication Data
US 2016/0318813 A1  Nov. 3, 2016

Related U.S. Application Data

(60) Provisional application No. 61/928,012, filed on Jan. 16, 2014.

(51) Int. Cl.
*C04B 35/636* (2006.01)
*C04B 35/195* (2006.01)
*C04B 35/638* (2006.01)

(52) U.S. Cl.
CPC ........ *C04B 35/6365* (2013.01); *C04B 35/195* (2013.01); *C04B 35/638* (2013.01); *C04B 2235/3436* (2013.01); *C04B 2235/48* (2013.01); *C04B 2235/6021* (2013.01)

(58) Field of Classification Search
CPC ................................................ C04B 35/6365
See application file for complete search history.

(56) References Cited

U.S. PATENT DOCUMENTS

| | | | |
|---|---|---|---|
| 4,316,982 A | 2/1982 | Holst et al. | |
| 4,551,295 A * | 11/1985 | Gardner | B29C 47/38 264/177.11 |
| 4,614,545 A | 9/1986 | Hess | |
| 5,041,248 A | 8/1991 | Renlund et al. | |
| 5,166,333 A * | 11/1992 | Breckwoldt | C04B 35/6365 536/124 |
| 6,589,627 B1 | 7/2003 | Nakanishi et al. | |
| 2011/0262689 A1* | 10/2011 | Bayer | C04B 35/195 428/116 |
| 2011/0262690 A1 | 10/2011 | Bayer | |
| 2013/0193370 A1 | 8/2013 | Adden et al. | |
| 2013/0236512 A1* | 9/2013 | Adden | C08B 11/193 424/400 |
| 2015/0028526 A1* | 1/2015 | Bayer | C04B 35/6365 264/630 |

FOREIGN PATENT DOCUMENTS

| | | |
|---|---|---|
| EP | 0210917 A2 | 2/1987 |
| EP | 1141029 A1 | 10/2001 |
| WO | 200318637 A1 | 3/2003 |
| WO | 2013119443 A1 | 8/2013 |

OTHER PUBLICATIONS

Van Hoy et al., Microfabrication of Ceramics by Co-extrusion, J. Am. Ceram. Soc., 81 (1), 1998, pp. 152-158.
Yoon et al., Multilayer Actuator Composed of PZN-PZT and PZN-PZT/Ag Fabricated by Co-Extrusion Process, J. Am. Ceram. Soc., 88 (6), 1998, pp. 1625-1627.
R. Lenk et al., SiC Platelet Orientation in a Liquid-Phase-Sintered Silicon Carbide Composite Formed by Thermoplastic Forming Techniques, Journal of the European Ceramic Society, 17, 1997, pp. 197-202.
Poulon-Quintin A. et al., Processing and structures of bi-phase oxide ceramic filaments, Journal of the European Ceramic Society, 24, 2004, pp. 101-110.
Fabregat F. et al., Influence of Kiln Atmosphere Variations on the Colour of Tiles, cfi/Ber. DKG 75, 1998, No. 5, pp. 35-37.
Beeaff D.R. et al., Rheological behavior of coextruded multilayer architectures, Journal of Materials Science, 37, 2002, pp. 1259-1264.

* cited by examiner

*Primary Examiner* — Erin Snelting
(74) *Attorney, Agent, or Firm* — Ballard Spahr LLP

(57) ABSTRACT

A heat moldable composition which useful for preparing ceramic bodies comprises an inorganic material that sets as a result of baking or sintering, and a hydroxypropyl methylcellulose having a DS of at least 1.4 and an MS of at least 0.6, wherein DS is the degree of substitution of methoxyl groups and MS is the molar substitution of hydroxypropoxyl groups, and a viscosity of up to 80 mPa·s, determined as a 2% by weight solution in water at 20° C., wherein the heat moldable composition comprises at least 40 weight percent of the inorganic material and at least 10 weight percent of the hydroxypropyl methylcellulose, and wherein the composition does not comprise more than 5 weight percent of water, all percentages being based on the total weight of the composition.

17 Claims, No Drawings

HEAT MOLDABLE CERAMIC COMPOSITION

FIELD

This invention relates to a heat moldable composition and its use for manufacturing molded bodies.

INTRODUCTION

The manufacture of molded bodies from inorganic materials that set as a result of baking or sintering, such as ceramic-forming materials, is generally known. According to one procedure the inorganic material is mixed and kneaded with water and molding aids such as organic binders, surfactants, lubricants, and plasticizers. The amount of water is usually from 10 to 60 weight parts, typically from 15 to 40 weight parts of water per 100 weight parts of the inorganic material. However, the presence of a substantial amount of water is undesirable when the inorganic material is not inert in the presence of water, when recycling of expensive inorganic material that has not set yet should be facilitated or when the presence of a substantial amount of water has another undesirable effect on the inorganic material to be molded.

It is also known to subject compositions comprising an inorganic material to thermal molding techniques, such as thermal extrusion. In known thermal extrusion processes the inorganic material is usually used in the form of a fine powder which is blended with a polymeric binder. The blend is extruded at a temperature between the glass transition temperature and the decomposition temperature of the polymeric binder to form a ceramic precursor known as "green body". The polymeric binder in the green body helps to maintain the structural integrity of the green body. Known polymeric binders for thermal extrusion of ceramic compositions are, e.g., polyethylenes, polyoxymethylenes, ethylene-ethylacrylate copolymers, ethylene-vinyl-acetate copolymers and poly(ethylene-co-butylacrylate). They are used in relatively high amounts to bind the inorganic particles without leaving void spaces between them and to enable the inorganic particles to be processed by thermal molding techniques. The polymeric binder is usually removed by thermal or catalytic decomposition. After removal of the binder, the shaped structure is baked to sinter the inorganic particles into a densified, shaped ceramic body. As disclosed in U.S. Pat. No. 5,041,248, a major problem with the known binders for thermoplastic ceramic molding compositions is that the thermal decomposition of the binder from the shaped ceramic precursor generally introduced defects, such as cracks and voids into the sintered body. To minimize defects known binders are removed very slowly. However, the known binders need very high debinding temperatures in the absence of oxygen. Typically the debinding atmosphere is oxygen free due to the oxidation sensitivity of the used materials. The above-mentioned binders are also well-known for the release of poisonous gases during the debinding step and for a remaining carbon content in the ceramic end product coming from incomplete combustion.

Accordingly, there is a long-felt need to provide a new heat moldable composition comprising an inorganic material that sets as a result of baking or sintering, and a binder wherein the binder can be removed under milder debinding conditions.

It has surprisingly been found that certain hydroxypropyl methylcelluloses are useful as a binder in heat moldable compositions that comprise an inorganic material that sets as a result of baking or sintering.

SUMMARY

One aspect of the present invention is a heat moldable composition which comprises an inorganic material, that sets as a result of baking or sintering, and a hydroxypropyl methylcellulose having a DS of at least 1.4 and an MS of at least 0.6, wherein DS is the degree of substitution of methoxyl groups and MS is the molar substitution of hydroxypropoxyl groups, and a viscosity of up to 80 mPa·s, determined as a 2% by weight solution in water at 20° C., wherein the heat moldable composition comprises at least 40 weight percent of the inorganic material and at least 10 weight percent of the hydroxypropyl methylcellulose, and wherein the composition does not comprise more than 5 weight percent of water, all percentages being based on the total weight of the composition.

Another aspect of the present invention is a method for manufacturing a molded body, which process comprises the steps of heating the above-mentioned composition to provide a moldable mass, subjecting the moldable mass to a thermal molding technique to produce a molded body and sintering the molded body.

Yet another aspect of the present invention is a molded body produced from the above-mentioned composition.

Yet another aspect of the present invention is the use of the molded body as a carrier for a catalyst, as a catalyst, a heat exchanger, a filter, a tube or a membrane.

DESCRIPTION OF EMBODIMENTS

The heat moldable composition of the present invention comprises an inorganic material that sets as a result of baking or sintering, preferably a ceramic-forming material. Masses which set as a result of baking or sintering do not include hydraulic binders such as cement or gypsum and do not include masses based on cement or gypsum. Inorganic ceramic-forming materials can be synthetically produced materials such as oxides, hydroxides, etc., or they can be naturally occurring minerals such as clays, talcs, or any combination of these. More preferably, the inorganic material is alumina or a precursor thereof, silica or a precursor thereof, an aluminate, aluminosilicate, alumina silica, feldspar, titania, fused silica, aluminum nitride, aluminum carbide, kaolin, cordierite or a precursor thereof, mullite or a precursor thereof, clay, bentonite, talc, zircon, zirconia, spinel, silicon carbide, silicon boride, silicon nitride, titanium dioxide, titanium carbide, boron carbide, boron oxide, borosilicate, soda barium borosilicate, silicates and sheet silicates, a silicon metal, carbon, ground glass, a rare earth oxide, soda lime, zeolite, barium titanate, lead titanate zirconate, aluminium titanate, barium ferrite, strontium ferrite, or a combination of two or more of such inorganic materials. The term "clay" means a hydrated aluminum silicate having a platy structure and forms plastic masses when mixed with water. Typically, clays are comprised of one or more crystalline structures such as kaolins, illites and smectites. Preferred oxides are those that form cordierite or mullite when mixed with clay (e.g., silica and talc for forming cordierite and alumina when forming mullite). The inorganic material is typically in the form of a powder. Typical particle sizes are up to 10 micrometers.

The inorganic material amounts to at least 40 wt %, preferably at least 45 wt %, more preferably at least 50 wt %, and even more preferably at least 55 wt %, based on the total weight of the composition. The amount of the inorganic material is up to 90 wt %, and preferably up to 85 wt %, or up to 80 wt %, or up to 75 wt., or up to 70 wt %, based on the total weight of the composition.

The heat moldable composition of the present invention further comprises a hydroxypropyl methylcellulose. Surprisingly, the hydroxypropyl methylcellulose utilized in the present invention can be subjected to thermal molding techniques under conditions that are typically applied to blends of inorganic powders and organic binders. The hydroxypropyl methylcellulose can be removed from the molded ceramic precursor ("green body") in the subsequent debinding step by thermal debinding or by extraction with water, which avoids the formation of poisonous gases.

The hydroxypropyl methylcellulose has a cellulose backbone having β-1,4 glycosidically bound D-glucopyranose repeating units, designated as anhydroglucose units in the context of this invention. The degree of the substitution of hydroxyl groups of the anhydroglucose units by methoxyl groups and hydroxypropoxyl groups is essential in the present invention. The hydroxyl groups of the anhydroglucose units are not substituted by any groups other than methoxyl and hydroxypropoxyl groups.

The average number of methoxyl groups per anhydroglucose unit is designated as the degree of substitution of methoxyl groups, DS. In the definition of DS, the term "hydroxyl groups substituted by methoxyl groups" is to be construed within the present invention to include not only methylated hydroxyl groups directly bound to the carbon atoms of the cellulose backbone, but also methylated hydroxyl groups of hydroxypropoxyl substituents bound to the cellulose backbone.

The degree of the substitution of hydroxyl groups of the anhydroglucose units by hydroxypropoxyl groups is expressed by the molar substitution of hydroxypropoxyl groups, the MS. The MS is the average number of moles of hydroxypropoxyl groups per anhydroglucose unit in the hydroxypropyl methylcellulose. It is to be understood that during the hydroxypropoxylation reaction the hydroxyl group of a hydroxypropoxyl group bound to the cellulose backbone can be further etherified by a methylation agent and/or a hydroxypropoxylation agent. Multiple subsequent hydroxypropoxylation reactions with respect to the same carbon atom position of an anhydroglucose unit yields a side chain, wherein multiple hydroxypropoxyl groups are covalently bound to each other by ether bonds, each side chain as a whole forming a hydroxypropoxyl substituent to the cellulose backbone. The term "hydroxypropoxyl groups" thus has to be interpreted in the context of the MS as referring to the hydroxypropoxyl groups as the constituting units of hydroxypropoxyl substituents, which either comprise a single hydroxypropoxyl group or a side chain as outlined above, wherein two or more hydroxypropoxyl units are covalently bound to each other by ether bonding. Within this definition it is not important whether the terminal hydroxyl group of a hydroxypropoxyl substituent is further methylated or not; both methylated and non-methylated hydroxypropoxyl substituents are included for the determination of MS.

The hydroxypropyl methylcellulose utilized in the composition of the present invention has a DS of at least 1.4, preferably at least 1.6, more preferably at least 1.7, and most preferably at least 1.8. The hydroxypropyl methylcellulose generally has a DS of up to 2.7, more typically up to 2.5, and even more typically up to 2.4.

The hydroxypropyl methylcellulose utilized in the composition of the present invention has an MS of at least 0.6, and preferably at least 0.7. The hydroxypropyl methylcellulose generally has an MS of up to 1.9, typically up to 1.7, more typically up to 1.5, and most typically up to 1.3.

The determination of the % methoxyl and % hydroxypropoxyl is carried out according to the United States Pharmacopeia (USP 35, "Hypromellose", pages 3467-3469). The values obtained are % methoxyl and % hydroxypropoxyl. These are subsequently converted into degree of substitution (DS) for methoxyl substituents and molar substitution (MS) for hydroxypropoxyl substituents. Residual amounts of salt are taken into account in the conversion.

The hydroxypropyl methylcellulose utilized in the composition of the present invention has a viscosity of up to 80 mPa·s, preferably up to 70 mPa·s, and more preferably up to 60 mPa·s, determined as a 2% by weight solution in water at 20° C. in a Haake VT550 Viscotester at a shear rate of 2.55 $s^{-1}$. The viscosity is preferably at least 2.4 mPa·s, more preferably at least 5 mPa·s, and most preferably at least 10 mPa·s. Hydroxypropyl methylcelluloses of such viscosity can be obtained by subjecting a hydroxypropyl methylcellulose of higher viscosity to a partial depolymerization process. Partial depolymerization processes are well known in the art and described, for example, in European Patent Applications EP 1,141,029; EP 210,917; EP 1,423,433; and U.S. Pat. No. 4,316,982.

The hydroxypropyl methylcelluloses utilized in the present invention and their use as thickening agents for organic liquids are described in U.S. Pat. No. 4,614,545, but their utility for preparing heat moldable compositions comprising an inorganic material that sets as a result of baking or sintering has been unknown before the present invention. The composition of the present invention can comprise one or more of the above-described hydroxypropyl methylcelluloses.

The hydroxypropyl methylcellulose amounts to at least 10 wt %, preferably at least 15 wt %, and more preferably at least 20 wt %, based on the total weight of the composition. The amount of the hydroxypropyl methylcellulose is up to 60 wt %, typically up to 50 wt %, more typically up to 45 wt. %, and most typically up to 40 wt. %, based on the total weight of the composition.

In one embodiment the heat moldable composition of the present invention also comprises a polymeric binder different from a hydroxypropyl methylcellulose. Preferably the amount of such polymeric binder is not higher than the amount of the hydroxypropyl methylcellulose. More preferably, the amount of such polymeric binder in the heat moldable composition is from 20 to 80 wt %, based on the weight of the hydroxypropyl methylcellulose. Examplary of polymeric binders which are different from a hydroxypropyl methylcellulose and which may be included in the heat moldable composition of the present invention are thermoplastic polymers, such as polyethylenes, polypropylenes, polyacrylates, polyoxymethylenes, ethylene-ethylacrylate copolymers, ethylene-vinyl-acetate copolymers, polyisobutylene polymers, poly(ethylene-co-butylacrylates) and combinations thereof.

The composition does not comprise more than 5 weight percent, preferably not more than 3 weight percent, and more preferably not more than 1 weight percent of water, based on the total weight of the composition. Moreover, the composition preferably does not comprise more than 5 weight percent, more preferably not more than 3 weight percent, and even more preferably not more than 1 weight percent of an organic solvent having a boiling point of up to 230° C. at atmospheric pressure, based on the total weight of the composition. Most preferably the composition does not comprise water or an organic solvent having a boiling point of up to 230° C. at atmospheric pressure.

The heat moldable composition of the present invention may further comprise other additives such as plasticizers, softeners, surfactants, waxes, oils, lubricants, stabilizers, antioxidants or a combination thereof.

Non-limiting examples of surfactants that can be used in the practice of the present invention are $C_8$ to $C_{22}$ fatty acids and/or their derivatives. Additional surfactant components that can be used with these fatty acids are $C_8$ to $C_{22}$ fatty esters, $C_8$ to $C_{22}$ fatty alcohols, and combinations of these. Exemplary surfactants are stearic, lauric, oleic, linoleic, palmitoleic acids, and their derivatives, stearic acid in combination with ammonium lauryl sulfate, and combinations of all of these. Most preferred surfactants are lauric acid, stearic acid, oleic acid, and combinations of these. The amount of surfactants typically may be from 0.1 to 3 percent, based on the weight of the hydroxypropyl methylcellulose. Non-limiting examples of lubricants are for example polyethylene oxide homopolymers, copolymers and terpolymers, glycols, or oil lubricants, such as light mineral oil, corn oil, high molecular weight polybutenes, polyol esters, a blend of light mineral oil and wax emulsion, a blend of paraffin wax in corn oil, and combinations of these. Typically, the amount of oil lubricants may be from 0.1 to 10 percent, more typically from 0.3 to 6 percent, based on the weight of the hydroxypropyl methylcellulose.

Uniform mixing of the inorganic material, the hydroxypropyl methylcellulose and optionally other additives such as a polymeric binder different from hydroxypropyl methylcellulose, and one or more optional components selected from surfactants, lubricants, stabilizers and antioxidants can be accomplished by, for example, a known conventional kneading process.

Another aspect of the present invention is a method for manufacturing a molded body which comprises the steps of heating the above-mentioned heat moldable composition to provide a moldable mass, subjecting the moldable mass to a thermal molding technique to produce a molded body and sintering the molded body.

Heating can be conducted before, during or after mixing of the inorganic material, the hydroxypropyl methylcellulose, typically a polymeric binder different from hydroxypropyl methylcellulose and optionally other additives such as surfactants, lubricants, plasticizers, softeners, waxes, oils, stabilizers or antioxidants. Typically heating is conducted during or after mixing of the above-mentioned components. The heat moldable composition of the present invention is heated to at least a temperature where the composition under pressure will be moldable, e.g., will flow through an extrusion die. Typically the mixture is heated to a temperature of at least 100° C., preferably at least 110° C. The temperature should generally not be above the temperature where the hydroxypropyl methylcellulose begins to degrade. Generally the mixture is heated to a temperature of up to 220° C., preferably up to 210° C., and more preferably up to 200° C. The mixture can be subjected to known thermal molding techniques, such as injection molding and, preferably, extrusion. The mixture can be shaped into a molded body, also known as "green body", by any known conventional ceramic extrusion process. In an exemplary aspect, extrusion can be done using a hydraulic ram extrusion press, or a two stage de-airing single auger extruder, or a twin screw extruder with a die assembly attached to the discharge end. The prepared molded body or "green body" is then treated to substantially remove the hydroxypropyl methylcellulose. According to one aspect of the invention the hydroxypropyl methylcellulose is removed in a washing step wherein the hydroxypropyl methylcellulose dissolves in water, preferably in water of ambient temperature. For example, the hydroxypropyl methylcellulose can be extracted from the prepared molded body or "green body" by placing the entire body in a water bath so that the water dissolves the hydroxypropyl methylcellulose and leaves the molded "green body" behind after the hydroxypropyl methylcellulose has been washed out of the molded body. Alternatively, the hydroxypropyl methylcellulose can be heated or baked to thermally decompose hydroxypropyl methylcellulose and remove the hydroxypropyl methylcellulose predominantly as gaseous decomposition products. Decomposition is accomplished by heating the molded body to a temperature that causes substantially complete decomposition of the hydroxypropyl methylcellulose at a heating rate that allows the decomposition products to diffuse from the molded body without forming voids or other defects. Typically the molded body is heated to a temperature of from 240 to 600, more typically from 280 to 550° C. Decomposition is typically performed in an atmosphere that removes the decomposition products without reacting with the inorganic powder. After removal of hydroxypropyl methylcellulose the green body can thereafter be fired under conditions effective to convert the green body into a sintered article according to known techniques. The firing conditions of temperature and time depend on the composition and size and geometry of the body, and the invention is not limited to specific firing temperatures and times. Typical temperatures are from 600° C. to 2300° C., and the holding times at these temperatures are typically from 1 hour to 20 hours.

The molded bodies according to the present invention can have any convenient size and shape. They find use in a number of applications such as carriers for catalysts, as catalysts, heat exchangers, filters, tubes, membranes and others. The composition and the method of the present invention are well suited for the production of hollow and full profiles.

The following examples are for illustrative purposes only and are not intended to limit the scope of the present invention. All percentages are by weight unless otherwise specified.

Example 1 and Comparative Examples A-E

Samples of hydroxypropyl methylcelluloses (HPMCs), each having a DS (methyl) of 2.2 and an MS (hydroxypropoxyl) of 1.2, but different viscosities are used in Example 1 and in Comparative Examples A-E. The determination of the % methoxyl and % hydroxypropoxyl is carried out according to the United States Pharmacopeia (USP 35, "Hypromellose", pages 3467-3469). These are subsequently converted into degree of substitution (DS) for methoxyl substituents and molar substitution (MS) for hydroxypropoxyl substituents. The viscosity of the HPMC samples is determined as a 2% by weight solution in water at 20° C. in a Haake VT550 Viscotester at a shear rate of 2.55 $s^{-1}$.

The HPMC samples are either commercially available or obtained by partial depolymerization of a HPMC of higher viscosity according to a known procedure. Partial depolymerization is achieved by heating a HPMC powder with gaseous hydrogen chloride at a temperature of 60-85° C. for 80-100 min.

Preparation of Moldable Composition in the Form of a Paste

A 30 ml kneading cell W30 of a Brabender Plasti-Corder PL 2000 torque kneader with a metallic cover is heated to 190° C. After automatic calibration of the empty cell a homogeneous mixture of the hydroxypropyl methylcellulose, optionally cordierite precursor material (Imerys cordierite CP820 M) and optionally other ingredients are filled into the cell. Homogenization is carried out at 30 rpm until a constant torque is reached.

Test on Thermal Stability of the HPMCs Under Kneading Conditions

Samples of hydroxypropyl methylcelluloses (HPMCs), each having a DS (methyl) of 2.2 and an MS (hydroxypropoxyl) of 1.2, but different viscosities as listed in Table 1 below are dosed into the above-mentioned torque kneader and kneaded for at least 40 min. To determine the thermal stability of the HPMC binder, a kneading test of the pure HPMC (without ceramic ingredients) is performed at 175-180° C. In order to observe the thermal stability, the course of the kneading torque with time is observed (see Table 1 below). Before the paste is homogeneous, the torque value shows many significant jumps, which can be attributed to the lacking homogeneity of the material. After the formation of a homogeneous paste, a drop of the torque with time can be attributed to thermal degradation of the HPMC molecules.

A homogeneous paste is achieved within a few minutes. As an indirect measure of the thermal decomposition of the HPMC molecules, the drop of the torque between the $20^{th}$ and $30^{th}$ minute of mixing is observed and referred in % in Table 1.

TABLE 1

| (Comparative) Example | 2% Viscosity of HPMC in water at 20° C. (mPa·s) | Torque after 20 min. of kneading (Nm) | Relative drop of torque between $20^{th}$ and $30^{th}$ min of mixing (%) |
|---|---|---|---|
| A | 73800 | 16.1 | 6.8 |
| B | 10000 | 14.1 | 6.6 |
| C | 3700 | 11.0 | 3.5 |
| D | 2200 | 11.5 | 3.5 |
| E | 90 | 10.3 | 2.9 |
| 1 | 40 | 9.7 | 0 |

Extrusion Trials

A capillary rheometer (Malvern RH10, Malvern Instruments) having a die of 2.0 mm diameter and 27.2 mm length is heated up to 173° C. and filled with a paste coming out of the above-described torque kneader and consisting of HPMC of Example 1 and a cordierite precursor material (Imerys cordierite CP820 M). The HPMC of Example 1 has a DS (methyl) of 2.2, an MS (hydroxypropxyl) of 1.2 and a viscosity of 40 mPa·s, determined as a 2% by weight solution in water at 20° C.

The vertical extrusion through the die is performed with a piston moving at about 5 mm/min. Spaghetti-like filaments are extruded. Table 2 illustrates three different successful extrusion trials using the HPMC of Example 1.

TABLE 2

| Formulation | | | Results | |
|---|---|---|---|---|
| HPMC (weight %) | Cordierite precursor (weight %) | Weight ratio Cordierite precursor/HPMC | Extrusion pressure (MPa) | Surface properties |
| 50 | 50 | (0.38 × cordierite density)/1 | 3.1 | Smooth |
| 40 | 60 | (0.58 × cordierite density)/1 | 3.1 | Smooth |
| 30 | 70 | (0.90 × cordierite density)/1 | 4.8 | Somewhat rougher surface |

Examples 2-8 and Comparative Examples F-H

Samples of HPMCs are provided which have a DS (methyl), an MS (hydroxypropoxyl) and a viscosity as listed in Table 3 below. The samples were prepared using a known method for etherification of alkalized cellulose. The etherification agents methyl chloride and propylene oxide were added to alkali cellulose and reacted at elevated temperatures. The resulting crude HPMC was neutralized, washed free of chloride using hot water, dried and ground. The produced HPMC was subjected to partial depolymerization as described for Example 1 and Comparative Examples A-E above.

Preparation of Moldable Composition in the Form of a Paste

A 30 ml kneading cell W30 of a Brabender Plasti-Corder PL 2000 torque kneader with a metallic cover is heated to a temperature above the softening temperature of the HPMC, as listed in Table 3 below. After automatic calibration of the empty cell, HPMC and optionally other materials are filled into the cell. Homogenization is carried out at 30 rpm until a constant torque is reached.

Extrusion Trials

A capillary rheometer (Malvern RH10, Malvern Instruments) having a die of 1.7 mm or 2.0 mm diameter and 27.2 mm length is heated to the temperature listed in Table 3 or 4 below and filled with a paste coming out of the above-described torque kneader. Vertical extrusion through the die is performed with a piston moving at about 5 mm/min. The resulting spaghetti-like filaments are evaluated by visual inspection.

In a first set of trials a paste coming out of the above-described torque kneader only consists of HPMC to test the extrusion performance of the HPMC itself. The capillary rheometer has a die of 1.7 mm diameter.

As illustrated by the results in Table 3, HPMCs which do not have a DS of at least 1.4 and an MS of at least 0.6 do not have sufficient thermoplasticity.

TABLE 3

| | HPMC properties | | | Extrusion | | | |
|---|---|---|---|---|---|---|---|
| (Comp.) Example | DS | MS | 2% viscosity (mPa·s) | softening Temp. (° C.) (1) | Kneading Temp. (° C.) (2) | Result (3) | Extrusion temp. (° C.)/pressure (MPa) |
| 2 | 2.0 | 0.76 | 7 | 109 | 118 | Plastic | 123° C./9 MPa |
| 3 | 2.05 | 0.80 | 14 | 100 | 102 | Plastic | 170° C./11 MPa |
| 4 | 2.02 | 0.83 | 6 | 100 | 148 | Plastic | 120° C./1 MPa |
| 5 | 1.97 | 0.80 | 6 | 98 | 101-110 | Plastic | 120° C./3 MPa |

TABLE 3-continued

| (Comp.) Example | HPMC properties | | | Extrusion | | | |
|---|---|---|---|---|---|---|---|
| | DS | MS | 2% viscosity (mPa·s) | softening Temp. (° C.) ($^1$) | Kneading Temp. (° C.) ($^2$) | Result ($^3$) | Extrusion temp. (° C.)/pressure (MPa) |
| 6 | 1.90 | 0.93 | 6 | 132 | 157-167 | Plastic | 165° C./n.d. |
| 7 | 1.91 | 1.04 | 7 | 137 | 156 | Plastic | 165° C./13 MPa |
| 8 | 1.84 | 1.17 | 5 | 133 | 148 | Plastic | 170° C./11 MPa |
| F | 1.49 | 0.15 | 180 | >240 | Not possible | — ($^4$) | Not possible |
| G | 1.81 | 0.18 | 50 | >240 | Not possible | — ($^4$) | Not possible |
| H | 1.92 | 0.44 | 4300 | >240 | Not possible | — ($^4$) | Not possible |

($^1$): softening temperature, determined with a hot stage microscope, heating rate: 2° C./min.
($^2$): real temperature in the kneading cell before kneading start
($^3$): paste properties in the kneader after visual inspection
n.d.: not determined
($^4$) Particles do not melt, no plastic mass In a second set of trials the extrusion performance of a ceramic cordierite-based mass is tested that contains 40 wt. % of a HPMC as listed in Table 4 below and 60 wt. of the same cordierite precursor material as in Example 1, both weight percentages being based on the total weight of the mass. The capillary rheometer has a die of 2.0 mm diameter.

TABLE 4

| Example | HPMC properties | | | Extrusion | | |
|---|---|---|---|---|---|---|
| | DS | MS | 2% viscosity (mPa·s) | Kneading Temperature (° C.) ($^1$) | Kneading torque (Nm) | Extrusion pressure (MPa) at Temp. (° C.) |
| 9 | 2.21 | 1.21 | 17 | 186 | 10.1 | 17 (175° C.) |
| 10 | 1.84 | 1.17 | 6 | 190 | 15 | 25.4 (175° C.) |
| 11 | 1.9 | 0.93 | 6 | 191 | 16.3 | 36 (175° C.) |
| 12 | 2.18 | 1.39 | 14 | 187 | 10.5 | 21.4 (175° C.) |
| 13 | 2.14 | 1.57 | 17 | 186 | 10.3 | 16.7 (175° C.) |
| 14 | 2.0 | 0.76 | 7 | 159 | 21 | 2.6 (153° C.) |

($^1$): real temperature in the kneading cell after 30 min kneading

What is claimed is:

1. A heat moldable composition comprising
an inorganic material that sets as a result of baking or sintering, and
a hydroxypropyl methylcellulose having a DS of at least 1.4 and a MS of at least 0.6, wherein DS is the degree of substitution of methoxyl groups and MS is the molar substitution of hydroxypropoxyl groups, and a viscosity of up to 80 mPa·s, determined as a 2% by weight solution in water at 20° C.,
wherein the heat moldable composition comprises at least 40 weight percent of the inorganic material and at least 10 weight percent of the hydroxypropyl methylcellulose, and
wherein the composition does not comprise more than 5 weight percent of water, all percentages being based on the total weight of the composition.

2. The composition of claim 1, wherein the viscosity of the hydroxypropyl methylcellulose is up to 60 mPa·s, determined as a 2% by weight solution in water at 20° C.

3. The composition of claim 2 wherein the hydroxypropyl methylcellulose has a DS of from 1.6 to 2.5.

4. The composition of claim 3 wherein the hydroxypropyl methylcellulose has an MS of from 0.6 to 1.7.

5. The composition of claim 2 wherein the hydroxypropyl methylcellulose has an MS of from 0.6 to 1.7.

6. The composition of claim 2 wherein the hydroxypropyl methylcellulose has a DS of from 1.8 to 2.4 and an MS of from 0.7 to 1.7.

7. The composition of claim 6 wherein the heat moldable composition comprises from 50 to 80 weight percent of the inorganic material and from 20 to 50 weight percent of the hydroxypropyl methylcellulose, all percentages being based on the total weight of the composition.

8. The composition of claim 1 wherein the hydroxypropyl methylcellulose has a DS of from 1.6 to 2.5.

9. The composition of claim 1 wherein the hydroxypropyl methylcellulose has an MS of from 0.6 to 1.7.

10. The composition of claim 1 wherein the inorganic material is a ceramic-forming material.

11. The composition of claim 1 wherein the inorganic material is an alumina or a precursor thereof, silica or a precursor thereof, an aluminate, aluminosilicate, alumina silica, feldspar, titania, fused silica, aluminum nitride, aluminum carbide, kaolin, cordierite, mullite, clay, bentonite, talc, zircon, zirconia, spinel, silicon carbide, silicon boride, silicon nitride, titanium dioxide, titanium carbide, boron carbide, boron oxide, borosilicate, soda barium borosilicate, a silicate, a sheet silicate, a silicon metal, carbon, ground glass, a rare earth oxide, soda lime, zeolite, barium titanate, lead titanate zirconate, aluminium titanate, barium ferrite, strontium ferrite, or a combination of two or more of such inorganic materials.

12. The composition of claim 1 comprising at least 50 weight percent of the inorganic material and at least 20 weight percent of the hydroxypropyl methylcellulose.

13. The composition of claim 1 additionally comprising a polymeric binder different from hydroxypropyl methylcellulose.

14. A method for manufacturing a molded body, comprising the steps of heating the composition of claim 1 to provide a moldable mass, subjecting the moldable mass to a thermal molding technique to produce a molded body and sintering the molded body.

15. The method of claim 14 wherein the composition is heated to a temperature of at least 100° C.

16. The method of claim 14 wherein, after having subjected the moldable mass to a thermal molding technique, the produced molded body is heated or baked to thermally decompose the hydroxypropyl methylcellulose.

17. The method of claim 14 wherein, after having subjected the moldable mass to a thermal molding technique, the produced molded body is placed into a water bath wherein the hydroxypropyl methylcellulose is washed out of the molded body.

\* \* \* \* \*